US010661332B2

(12) United States Patent
Sutterfield et al.

(10) Patent No.: US 10,661,332 B2
(45) Date of Patent: *May 26, 2020

(54) MONOLITHIC BYPASS

(71) Applicant: Mueller International, LLC, Atlanta, GA (US)

(72) Inventors: Matthew Thomas Sutterfield, Signal Mountain, TN (US); Jason White Bradley, Soddy Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/483,285

(22) Filed: Apr. 10, 2017

(65) Prior Publication Data

US 2018/0292026 A1 Oct. 11, 2018

(51) Int. Cl.
*F16K 11/00* (2006.01)
*B22C 1/16* (2006.01)
(Continued)

(52) U.S. Cl.
CPC .................. *B22C 1/16* (2013.01); *B22C 9/02* (2013.01); *B22C 9/24* (2013.01); *B22D 25/02* (2013.01);
(Continued)

(58) Field of Classification Search
CPC . E03B 7/071; E03B 7/072; B22C 1/16; Y10T 137/87338
See application file for complete search history.

(56) References Cited

U.S. PATENT DOCUMENTS

| 1,067,011 A | 7/1913 | Earle |
| 2,589,170 A | 3/1952 | Ver Nooy |
| (Continued) | | |

FOREIGN PATENT DOCUMENTS

| KR | 2002700460000 | 3/2002 |
| WO | 2016016035 | 2/2016 |
| (Continued) | | |

OTHER PUBLICATIONS

Sutterfield, Matthew Thomas; Non-Final Office Action for U.S. Appl. No. 15/346,047, filed Nov. 8, 2016, dated Dec. 6, 2017, 22 pgs.

(Continued)

*Primary Examiner* — Reinaldo Sanchez-Medina
(74) *Attorney, Agent, or Firm* — Taylor English Duma LLP

(57) ABSTRACT

A monolithic bypass includes an upstream conduit, the upstream conduit defining a first end and a second end, the upstream conduit defining an upstream bore extending from the first end to the second end, the first end defining an inlet opening to the upstream bore; a downstream conduit, the downstream conduit defining a first end and a second end, the downstream conduit defining a downstream bore extending from the first end to the second end, the first end defining an outlet opening to the downstream bore; and a bypass valve body seamlessly connected to the second end of the upstream conduit and the second end of the downstream conduit, the bypass valve body defining a bypass body bore, the upstream bore, the downstream bore, and the bypass body bore defining a seamless bypass bore extending from the inlet opening to the outlet opening; wherein the monolithic bypass is substantially U-shaped.

20 Claims, 9 Drawing Sheets

(51) Int. Cl.
  *B33Y 10/00* (2015.01)
  *B33Y 80/00* (2015.01)
  *B22D 25/02* (2006.01)
  *B22C 9/24* (2006.01)
  *B22C 9/02* (2006.01)
  *F16K 39/04* (2006.01)
  *F16K 27/04* (2006.01)

(52) U.S. Cl.
  CPC ............... *B33Y 10/00* (2014.12); *B33Y 80/00* (2014.12); *F16K 27/044* (2013.01); *F16K 39/04* (2013.01)

(56) References Cited

U.S. PATENT DOCUMENTS

| | | | |
|---|---|---|---|
| 2,718,233 | A | 9/1955 | Krummel et al. |
| 2,819,034 | A | 1/1958 | Holderer |
| 3,055,394 | A | 9/1962 | Dilliner |
| 3,130,742 | A | 4/1964 | Bredtschneider |
| 3,130,750 | A | 4/1964 | Post |
| 3,135,284 | A | 6/1964 | Magos |
| 3,400,736 | A | 9/1968 | Bastle |
| 3,605,810 | A | 9/1971 | Moroney |
| 4,113,826 | A | 9/1978 | Jones |
| 4,359,082 | A | 11/1982 | Michel |
| 5,676,169 | A | 10/1997 | Landrum |
| 5,794,653 | A | 8/1998 | Desmet et al. |
| 6,588,442 | B2 | 7/2003 | Babin |
| 6,945,274 | B1 | 9/2005 | Davis |
| 8,171,959 | B2 | 5/2012 | Larsen et al. |
| 9,599,075 | B2 | 3/2017 | Luehrsen |
| 9,840,991 | B2 * | 12/2017 | Elia .................. F02M 37/08 |
| 10,378,661 | B2 | 8/2019 | Sutterfield et al. |
| 2005/0205139 | A1 * | 9/2005 | Walter .................. E03B 7/077 137/599.11 |
| 2008/0026093 | A1 | 1/2008 | Osaki |
| 2013/0037114 | A1 | 2/2013 | Sudhalkar |
| 2013/0092126 | A1 | 4/2013 | Leone |
| 2014/0060768 | A1 | 3/2014 | Hasenbusch |
| 2014/0251472 | A1 | 9/2014 | Woods |
| 2014/0261739 | A1 | 9/2014 | Fulkerson |
| 2015/0292422 | A1 | 10/2015 | Tsunooka |
| 2016/0312903 | A1 | 10/2016 | Dille |
| 2016/0331036 | A1 | 11/2016 | Cameron |
| 2017/0051663 | A1 | 2/2017 | Inoue |
| 2018/0128383 | A1 | 5/2018 | Sutterfield et al. |
| 2019/0126341 | A1 | 5/2019 | Sutterfield et al. |
| 2019/0316690 | A1 | 10/2019 | Sutterfield et al. |

FOREIGN PATENT DOCUMENTS

| | | |
|---|---|---|
| WO | 2018089155 | 5/2018 |
| WO | 2018190997 | 10/2018 |

OTHER PUBLICATIONS

Sutterfield, Matthew Thomas; International Search Report and Written Opinion for PCT Application No. PCT/US2017/056056, filed Oct. 11, 2017, dated Jan. 31, 2018, 16 pgs.

Sutterfield, Matthew Thomas; Invitation to Pay Additional Fees for PCT International Application No. PCT/US2017/056056, filed Oct. 11, 2017, dated Nov. 30, 2017, 2 pgs.

Sutterfield, Matthew Thomas; Applicant-Initiated Interview Summary for U.S. Appl. No. 15/346,047, filed Nov. 8, 2016, dated Jan. 30, 2019, 5 pgs.

Sutterfield, Matthew Thomas; Non-Final Office Action for U.S. Appl. No. 15/346,047, filed Nov. 8, 2016, dated Nov. 21, 2018, 28 pgs.

Sutterfield, Matthew Thomas; Final Office Action for U.S. Appl. No. 15/346,047, filed Nov. 8, 2016, dated Apr. 4, 2018, 19 pgs.

Sutterfield, Matthew Thomas; International Search Report and Written Opinion for PCT Application No. PCT/US18/23555, filed Mar. 21, 2018, dated Jun. 29, 2018, 8 pgs.

Asmuss Water Systems; Brochure for Sureflow Gate Valve/Integral Bypass, publicly available prior to Nov. 8, 2016, 3 pgs.

Sutterfield, Matthew Thomas; Corrected Notice of Allowance for U.S. Appl. No. 15/346,047, filed Nov. 8, 2016, dated Jun. 4, 2019, 6 pgs.

Sutterfield, Matthew Thomas; Notice of Allowance for U.S. Appl. No. 15/346,047, filed Nov. 8, 2016, dated Apr. 17, 2019, 12 pgs.

Sutterfield, Matthew Thomas; International Preliminary Report on Patentability for PCT Application No. PCT/US2017/056056, filed Oct. 11, 2017, dated May 23, 2019, 13 pgs.

Sutterfield, Matthew Thomas; Corrected Notice of Allowance for U.S. Appl. No. 15/346,047, filed Nov. 8, 2016, dated Jul. 1, 2019, 7 pgs.

Sutterfield, Matthew Thomas; International Preliminary Report on Patentability for PCT Application No. PCT/US18/23555, filed Mar. 21, 2018, dated Oct. 15, 2019, 7 pgs.

Sutterfield, Matthew Thomas; Notice of Allowance for U.S. Appl. No. 16/233,696, filed Dec. 27, 2018, dated Jan. 15, 2020, 22 pgs.

In Sutterfield, Matthew Thomas; Supplemental Notice of Allowance for U.S. Appl. No. 16/233,696, filed Feb. 27, 2018, dated Mar. 10, 2020, 6 pgs.

* cited by examiner

MONOLITHIC BYPASS

TECHNICAL FIELD

This disclosure relates to valves with a bypass. More specifically, this disclosure relates to a monolithic bypass.

BACKGROUND

Valves in high-pressure piping systems can comprise a primary valve body and a bypass. When a valve is closed, a valve member, such as a gate, a ball, or a disc, can seal a bore of the valve, thereby preventing passage of fluids such as liquids or gases through the bore. When a closed valve is subjected to a high pressure differential, a large unbalanced force acts on the valve member of the valve. The unbalanced force can make the valve difficult to open due to friction acting on the valve member. The effect can be exacerbated as the cross-sectional area of the valve bore and the pressure differential increase. Large-diameter valves can comprise a smaller bypass which can be opened to allow the pressure to equalize on either side of the larger valve, thereby alleviating the unbalanced force. It can be desirable for the large-diameter valve to have the bypass attached to the primary valve body, such as in applications where space and equipment clearance are limited. However, typical bypasses can be difficult and expensive to manufacture. Typical bypasses are constructed from common pipe fittings such as elbows and nipples which are welded or mechanically coupled together. The welded and mechanically coupled connections can be prone to fabrication defects, misalignment between pipe fittings, and leaking.

For example, in some applications, a pair of threaded nipples can be screwed into a pair of internally threaded holes defined by the primary valve body. The threaded nipples and the threaded holes commonly use a tapered thread pattern, such as a National Pipe Taper (NPT) thread standard. The threaded nipple must be fully screwed into the threaded hole in order to fully seal; however, depending on a depth and indexing of the internal threading, a flange of the threaded nipple may not be indexed properly to connect with an adjacent elbow. The depth of the internal threading can be cut deeper to correct for indexing of the elbow, but the depth of the internal threaded holes must be substantially similar so that the threaded nipples extend outwards from the primary valve body at substantially the same distance or misalignment can occur between the elbows. Because these variables are interrelated, properly aligning and sealing each of the common pipe fittings of a typical bypass can cause extensive rework and manufacturing delays.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a monolithic bypass comprising an upstream conduit, the upstream conduit defining a first end and a second end, the upstream conduit defining an upstream bore extending from the first end to the second end, the first end defining an inlet opening to the upstream bore; a downstream conduit, the downstream conduit defining a first end and a second end, the downstream conduit defining a downstream bore extending from the first end to the second end, the first end defining an outlet opening to the downstream bore; and a bypass valve body seamlessly connected to the second end of the upstream conduit and the second end of the downstream conduit, the bypass valve body defining a bypass body bore extending from the second end of the upstream conduit to the second end of the downstream conduit, the bypass body bore intersecting the upstream bore and the downstream bore, the bypass body bore defining a bypass body bore axis, the upstream bore, the downstream bore, and the bypass body bore defining a seamless bypass bore extending from the inlet opening to the outlet opening; and wherein the monolithic bypass is substantially U-shaped.

Also disclosed is a valve assembly comprising a primary valve body, the primary valve body defining an upstream end and a downstream end disposed opposite from the upstream end, the primary valve body defining a primary outer surface and a primary inner surface disposed opposite from the primary inner surface, the primary inner surface defining a primary bore extending from the upstream end to the downstream end, the primary valve body defining an upstream boss bore and a downstream boss bore each extending through the primary valve body from the primary outer surface to the primary inner surface, the upstream boss bore intersecting an upstream portion of the primary bore proximate to the upstream end, the downstream boss bore intersecting a downstream portion of the primary bore proximate to the downstream end; and a monolithic bypass, the monolithic bypass comprising an upstream conduit, the upstream conduit defining a first end and a second end, the upstream conduit defining a seamless upstream bore extending from the first end to the second end, the upstream bore sealed in fluid communication with the upstream boss bore at the first end; a downstream conduit, the downstream conduit defining a first end and a second end, the downstream conduit defining a seamless downstream bore extending from the first end to the second end, the downstream bore sealed in fluid communication with the downstream boss bore at the first end; and a bypass valve body seamlessly connected to the second end of the upstream conduit and the second end of the downstream conduit, the bypass valve body defining a bypass body bore extending from the second end of the upstream conduit to the second end of the downstream conduit, the bypass body bore seamlessly intersecting the upstream bore and the downstream bore.

Also disclosed is a method for forming a monolithic bypass, the method comprising pouring a molten metal into a monolithic bypass mold cavity of a mold, the monolithic bypass mold cavity shaped complimentary to a shape of the monolithic bypass; forming the monolithic bypass, the monolithic bypass comprising a bypass valve body disposed between an upstream conduit and a downstream conduit, an inlet opening defined by the upstream conduit, an outlet opening defined by the downstream conduit, a bypass bore extending through the upstream conduit, the bypass valve body, and the downstream conduit from the inlet opening to the outlet opening, the inlet opening and the outlet opening configured to attach to a primary valve body, the monolithic bypass defining a U-shape, the monolithic bypass and the bypass bore each being seamless; and removing the monolithic bypass from the mold.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
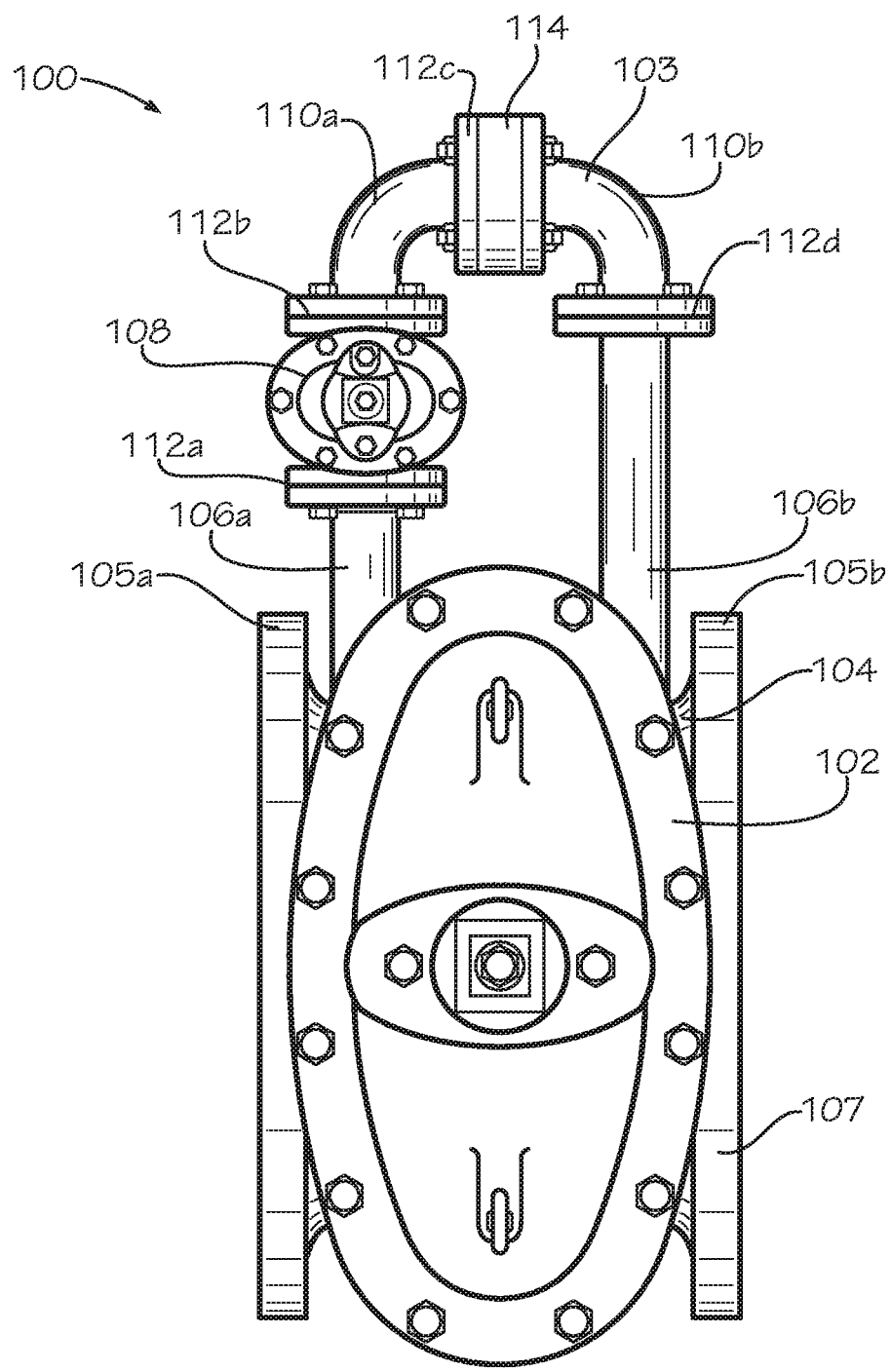
FIG. 1 is top view of a typical valve assembly with a typical bypass assembly.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

In one aspect, disclosed is a valve body assembly and associated methods, systems, devices, and various apparatus. The valve body assembly can comprise a primary valve body and a monolithic bypass. It would be understood by one of skill in the art that the disclosed valve body assembly is described in but a few exemplary aspects among many. No particular terminology or description should be considered limiting on the disclosure or the scope of any claims issuing therefrom.

An example of a typical valve assembly 100 comprising a typical primary valve 102 and a typical bypass assembly 103 is disclosed and described in FIG. 1. The typical primary valve 102 is built on a typical valve body 107. The typical valve body 107 comprises a typical body portion 104 positioned between a first flange 105a and a second flange 105b. The typical bypass assembly 103 comprises a pair of nipples 106a,b, a bypass valve 108, and a pair of elbows 110a,b connected by a series of flanged connections 112a, b,c,d. The typical bypass assembly 103 can further comprise a spacer 114 installed between flanges of the flanged connection 112c. Each of the nipples 106a,b can define a threaded portion (not shown) which can each threadedly engage a threaded hole (not shown) defined by the typical body portion 104 in order to attach the typical bypass assembly 103 to the typical valve body 107. Optionally, the nipples 106a,b of the typical bypass assembly 103 can be attached to the typical body portion 104 of the typical valve body 107 by a pair of weld seams (not shown), such as butt welds, fillet welds, socket welds, or seal welds.

Figure 2:
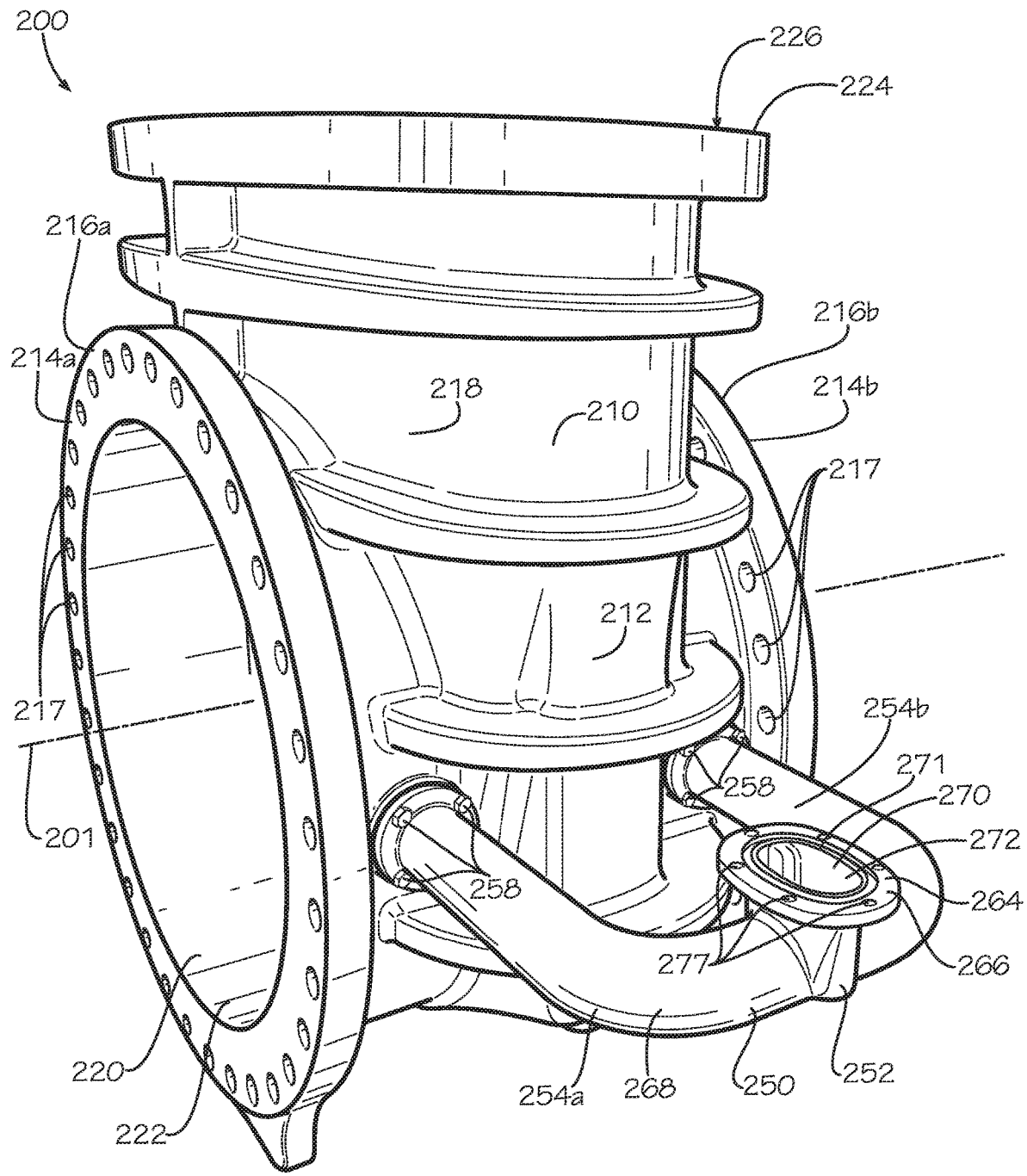
FIG. 2 is a perspective view of a valve body assembly comprising a primary valve body and a monolithic bypass in a side-mount configuration in accordance with one aspect of the present disclosure.

FIG. 2 shows a perspective view of a valve body assembly 200 which can comprise a primary valve body 210 and a monolithic bypass 250 in accordance with one aspect of the present disclosure. The primary valve body 210 can define a primary outer surface 218 and a primary inner surface 220 disposed opposite from the primary outer surface 218. The primary valve body 210 can define an upstream end 214a and a downstream end 214b disposed opposite from the upstream end 214a. A primary upstream flange 216a can be disposed at the upstream end 214a, and a primary downstream flange 216b can be disposed at the downstream end 214b. Each primary flange 216a,b, can define a plurality of fastener holes 217 configured to connect each primary flange 216a,b, for example and without limitation, to another flange or gland of a pipe system (not shown). The primary inner surface 220 can define a primary bore 222 extending from the upstream end 214a to the downstream end 214b. The primary bore 222 can define a primary bore axis 201. The primary valve body 210 can define a middle portion 212 positioned between the primary upstream flange 216a and the primary downstream flange 216b. The primary valve body 210 can also define a primary bonnet mounting portion 224 and a primary bonnet mounting surface 226.

The monolithic bypass 250 can define a bypass outer surface 268 and a bypass inner surface 270 disposed opposite from the bypass outer surface 268. The monolithic bypass 250 can comprise an upstream conduit 254a and a downstream conduit 254b which can each be attached to the middle portion 212 of the primary valve body 210 by a plurality of fasteners 258. The monolithic bypass 250 can further comprise a bypass valve body 252 disposed between the upstream conduit 254a and the downstream conduit 254b. The upstream conduit 254a, the bypass valve body 252, and the downstream conduit 254b can define a U-shape. The bypass valve body 252 can define a bypass bonnet mounting portion 264 and a bypass bonnet mounting surface 266. The bypass bonnet mounting portion 264 can define a plurality of fastener holes 277 configured to attach a bypass bonnet 952 (shown in FIG. 9) to the bypass bonnet mounting portion 264. The bypass inner surface 270 can define a bypass valve cavity 272 extending inwards from the bypass bonnet mounting portion 264. An intersection of the bypass valve cavity 272 and the bypass bonnet mounting portion 264 can define a bypass cavity opening 271.

In other aspects, the monolithic bypass 250 may only comprise the bypass valve body 252 and a single conduit (not shown). In such applications, the bypass valve body 252 can be attached directly to the middle portion 212 of the primary valve body 210 proximate either the upstream end 214a or the downstream end 214b, and the single conduit can define a J-shape extending from the bypass valve body 252 to connect with the middle portion 212 of the primary valve body 210 at the opposite end 214a,b from the bypass valve body 252. In these aspects, the J-shape of the single conduit and the bypass valve body 252 can define the U-shape of the monolithic bypass 250.

In the aspect shown, the monolithic bypass 250 is installed in a side-mount configuration in which the monolithic bypass 250 extends radially outwards from a side of the primary valve body 210 with respect to the primary bore axis 201.

Figure 3:
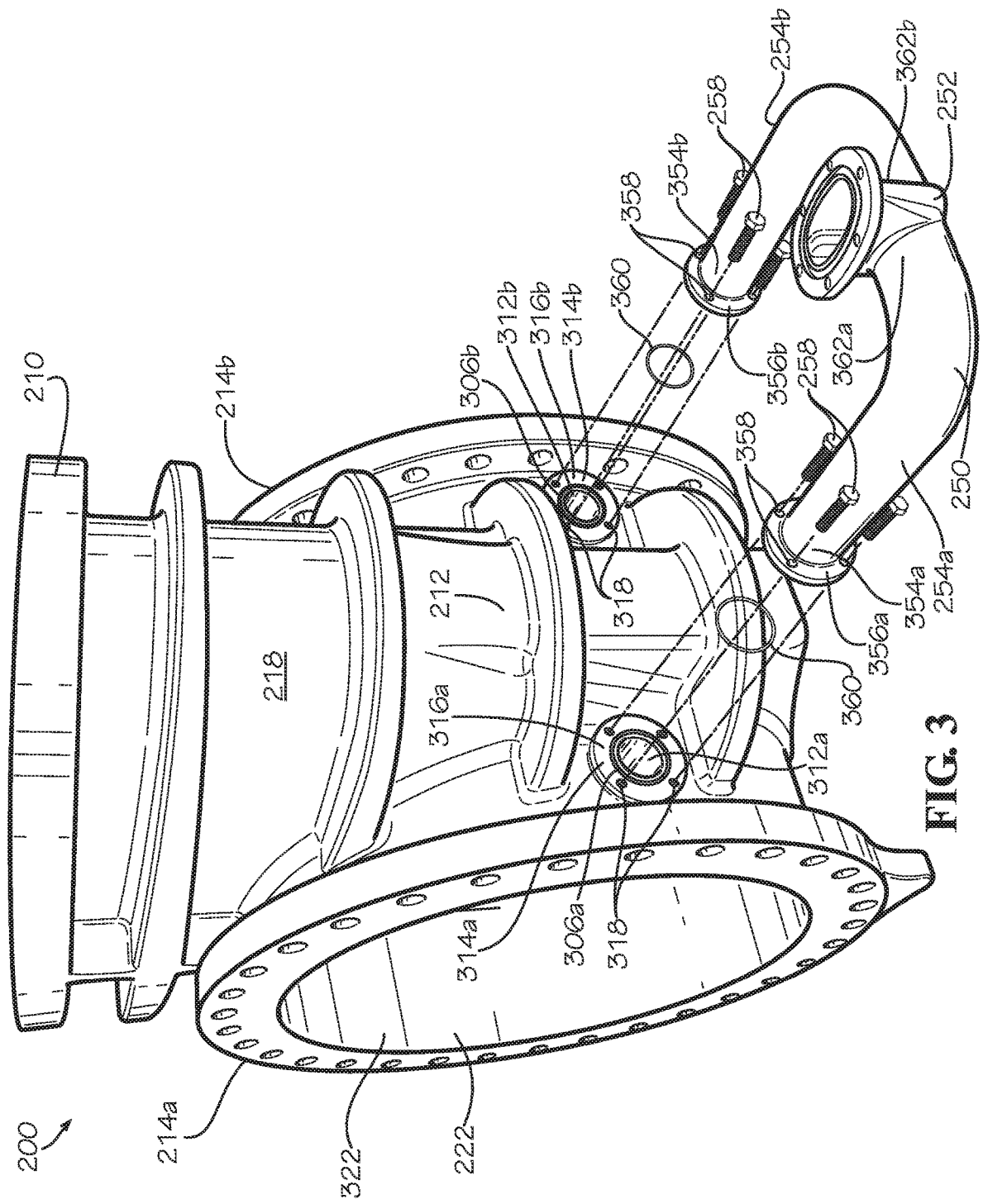
FIG. 3 is an exploded view of the valve body assembly of FIG. 2.

FIG. 3 shows an exploded view of the valve body assembly 200 of FIG. 2. As shown, the primary outer surface 218 of the primary valve body 210 can define an upstream boss 314a and a downstream boss 314b. The upstream boss 314a can be disposed on the middle portion 212 proximate the upstream end 214a, and the downstream boss 314b can be disposed on the middle portion 212 proximate the downstream end 214b. The upstream boss 314a can define an upstream boss face surface 316a, and the downstream boss 314b can define a downstream boss face surface 316b. In the present aspect, the upstream boss face surface 316a and the downstream boss face surface 316b can be substantially coplanar. In other aspects, the upstream boss face surfaces 316a can be offset from the downstream boss face surface 316b such that the boss face surfaces 316a,b are parallel but not coplanar. In other aspects, the upstream boss face surface 316a can be angled relative to the downstream boss face surface 316b such that the boss face surfaces 316a,b are non-parallel. In other aspects, the upstream boss face surface 316a can be both offset and angled relative to the downstream boss face surface 316b.

In the present aspect, the upstream boss 314a defines a plurality of fastener holes 318 defined into the upstream boss face surface 316a, and the downstream boss 314b defines another plurality of fastener holes 318 defined into the downstream boss face surface 316b. In the present aspect, the fastener holes 318 can each be threaded blind holes configured to receive a fastener of the pluralities of fasteners 258. The fasteners 258 can be threaded fasteners such as bolts, screws, studs, or any other threaded fasteners. In the present aspect, the fastener holes 318 do not extend through the primary valve body 210 to the primary inner surface 220.

The upstream boss 314a can further define an upstream boss bore 312a extending from the primary outer surface 218 to the primary inner surface 220. The upstream boss bore 312a can intersect an upstream bore portion 322 of the primary bore 222. The downstream boss 314b can further define a downstream boss bore 312b extending from the primary outer surface 218 to the primary inner surface 220. The downstream boss bore 312b can intersect a downstream bore portion 622 (shown in FIG. 6) of the primary bore 222. The upstream boss bore 312a and the downstream boss bore 312b can each be aligned substantially perpendicular to the primary bore 222, and the first upstream boss bore 312a and the first downstream boss bore 312b can be substantially parallel to each other. In other aspects, the upstream boss bore 312a can be angled relative to the downstream boss bore 312b.

The upstream conduit 254a can define a first end 354a and a second end 362a disposed opposite from the first end 354a. The downstream conduit 254b can define a first end 354b and a second end 362b disposed opposite from the first end 354b. The upstream conduit 254a can be seamlessly attached to the bypass valve body 252 at the second end 362a, and the downstream conduit 254b can be seamlessly attached to the bypass valve body 252 at the second end 362b. An upstream conduit flange 356a can be disposed at the first end 354a, and a downstream conduit flange 356b can be disposed at the first end 354b. The upstream conduit flange 356a can be configured to attach to the upstream boss 314a, and the downstream conduit flange 356b can be configured to attach to the downstream boss 314b.

The conduit flanges 356a,b can each define a plurality of fastener holes 358 which can each align with a different fastener hole of the pluralities of fastener holes 318 defined by the bosses 314a,b, in order to each receive a different one of the fasteners of the pluralities of fasteners 258. An O-ring 360 can be positioned between the upstream boss face surface 316a and the upstream conduit flange 356a, and another O-ring 360 can be positioned between the downstream boss face surface 316b and the downstream conduit flange 356b. The O-rings 360 can each form a seal between the respective bosses 314a,b and conduit flanges 356a,b.

Figure 6:
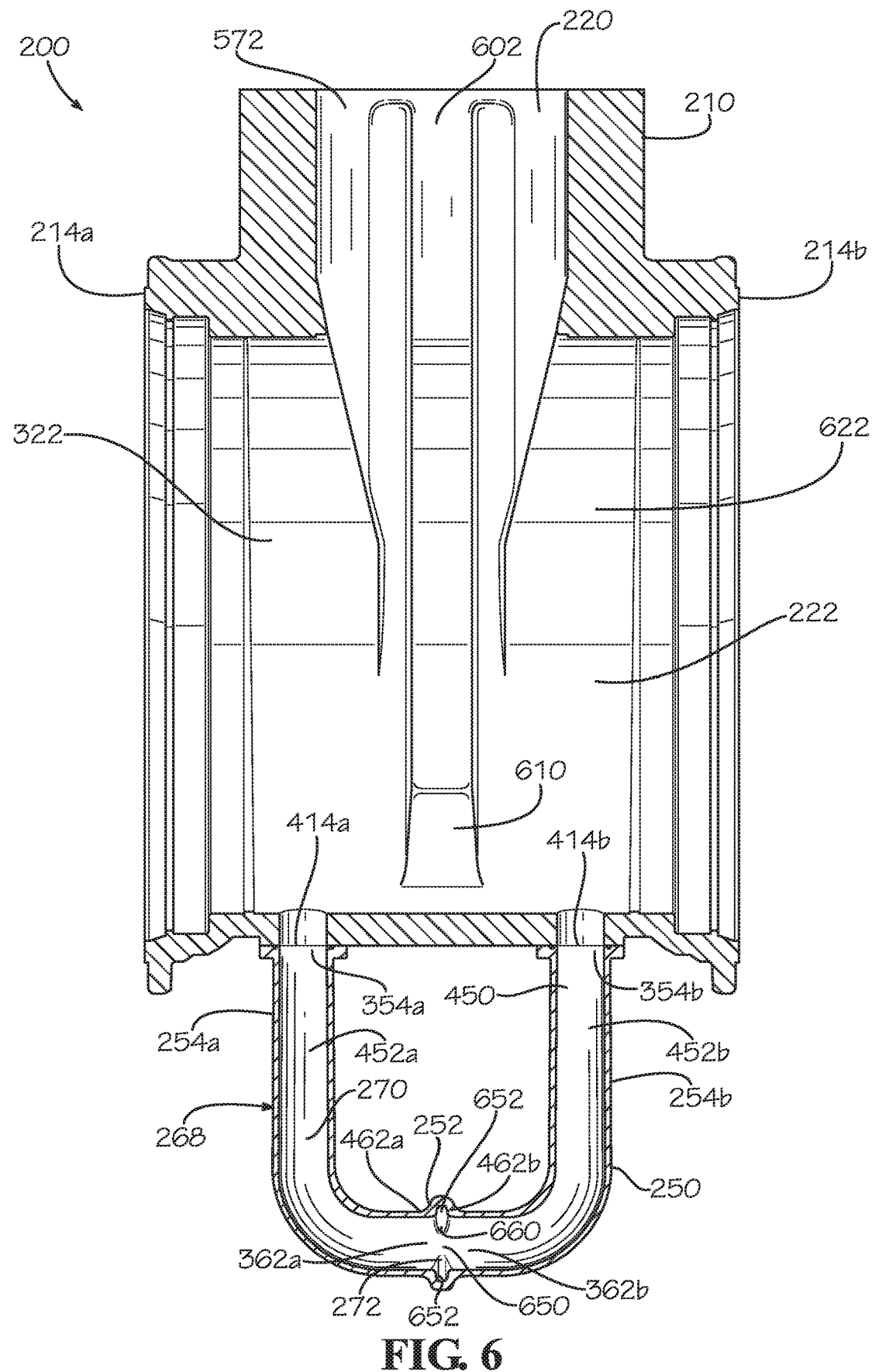
FIG. 6 is a cross-sectional view of the valve body assembly of FIG. 5 taken along line 6-6 shown in FIG. 5.

In the present aspect, the bosses 314a,b can each define an O-ring groove 306a,b, respectively; however in other aspects, the bosses 314a,b may not define O-ring grooves, as shown, for example, by a pair of second bosses 516a,b in FIG. 6. The O-ring grooves 306a,b can be defined extending into respective bosses 314a,b below the respective boss face surfaces 316a,b. The O-ring grooves 306a,b can be sized and shaped complimentary to the O-rings 360, and the O-ring grooves 306a,b can each be configured to receive a one of the O-rings 360. In other aspects, the boss face surfaces 316a,b may not define the O-ring grooves 306a,b, respectively.

Figure 4:
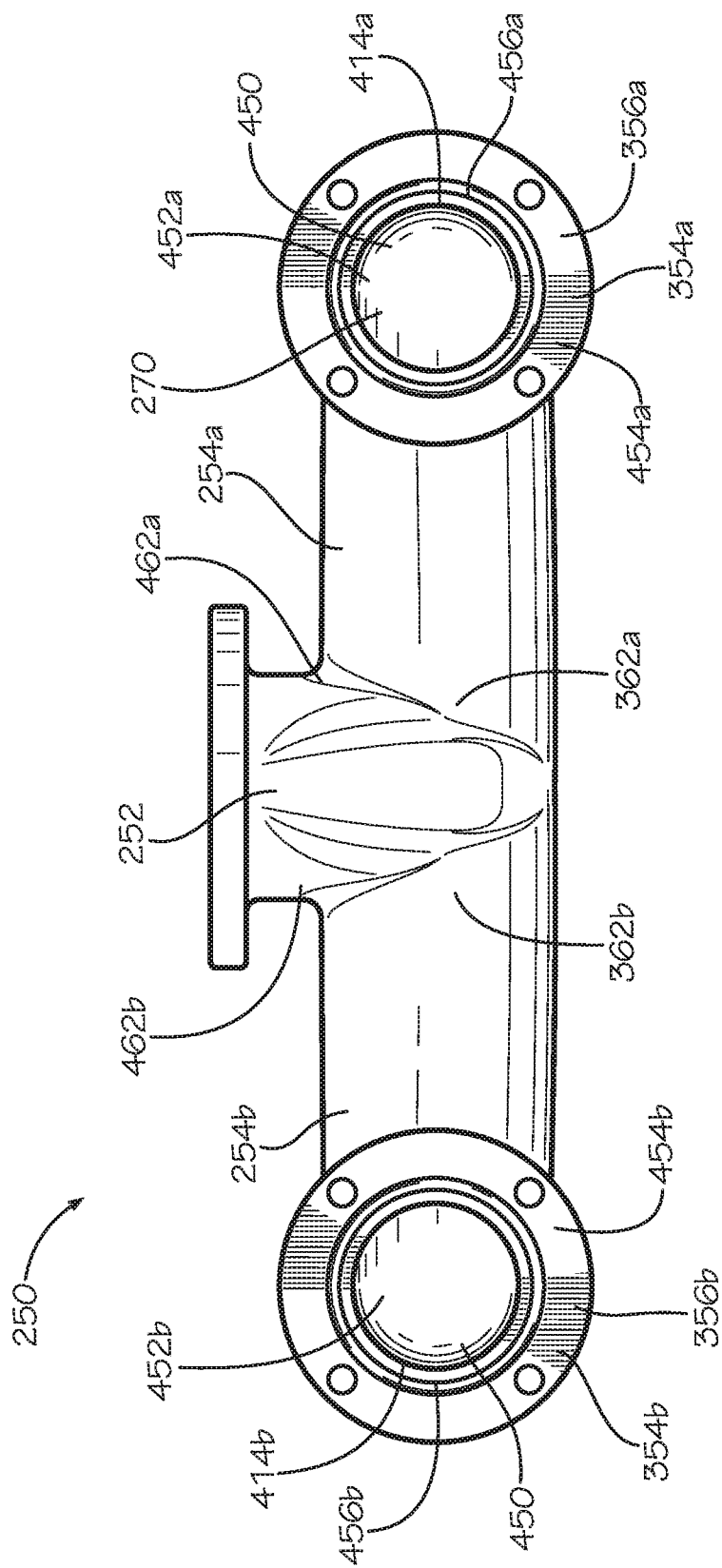
FIG. 4 is a side view of the monolithic bypass of FIG. 2.

FIG. 4 is a side view of the monolithic bypass 250 facing the first ends 354a,b of the upstream and downstream conduits 254a,b. The upstream conduit flange 356a can define an upstream flange face surface 454a, and the downstream conduit flange 356b can define a downstream flange face surface 454b. The flange face surfaces 454a,b can each be substantially planar. In the present aspect, the flange face surfaces 454a,b can be substantially coplanar; however, in other aspects, the upstream flange face surface 454a can be angled, offset, or both angled and offset relative to the downstream flange face surface 454b.

The bypass inner surface 270 of the monolithic bypass 250 can define a bypass bore 450 extending from the first end 354a of the upstream conduit 254a to the first end 354b of the downstream conduit 254b. The bypass bore 450 can comprise an upstream bore 452a extending from the first end 354a to the second end 362a of the upstream conduit 254a where the upstream conduit 254a can be seamlessly attached to an upstream body end 462a of the bypass valve body 252. An intersection between the upstream bore 452a and the upstream flange face surface 454a can define an inlet opening 414a. The bypass bore 450 can also comprise a downstream bore 452b extending from the first end 354b to the second end 362b of the downstream conduit 254b where the downstream conduit 254b can be seamlessly attached to a downstream body end 462b of the bypass valve body 252. An intersection between the downstream bore 452b and the downstream flange face surface 365b can define an outlet opening 414b.

The conduit flanges 356a,b can each define an O-ring groove 456a,b, respectively. The O-ring grooves 456a,b can be defined extending into the respective conduit flanges 356a,b below the respective flange face surfaces 454a,b. The O-ring grooves 456a,b can be sized and shaped complimentary to the O-rings 360, and the O-ring grooves 456a,b can each be configured to receive a one of the O-rings 360. In the present aspect, the O-ring grooves 456a,b can each be aligned with a one of the O-ring grooves 306a,b (shown in FIG. 3). The O-ring grooves 456a,b and the O-ring grooves 306a,b can respectively cooperate to provide clearance for a one of the O-rings 360 to deform when the respective flange face surfaces 454a,b are positioned in facing contact with the respective boss face surfaces 316a,b. In other aspects, the bosses 314a,b may not define the O-ring grooves 306a,b, and the O-ring grooves 456a,b can independently capture and deform the O-rings 360a,b, respectively. In other aspects, the conduit flanges 356a,b can each define other features configured to effect a seal between the conduit flanges 356a,b and the bosses 314a,b, respectively. For example and without limitations, the conduit flanges 356a,b and bosses 314a,b can form a raised-face joint, a ring-type joint, a tongue-and-groove joint, a male-and-female joint, or any other type of joint. In other aspects, a different sealing member other than the O-rings 360 can be used, such as a gasket, a sealing material such as Room Temperature Vulcanizing (RTV) silicone, a ring, or any other type of suitable sealing member.

With the monolithic bypass 250 installed on the primary valve body 210, the inlet opening 414a can align with the upstream boss bore 312a, and the outlet opening 414b can align with the downstream boss bore 312b. The upstream bore 452a can be sealed in fluid communication with the upstream boss bore 312a, and thereby the upstream bore portion 322 of the primary bore 222. The downstream bore 452b can be sealed in fluid communication with the downstream boss bore 312b, and thereby the downstream bore portion 622 (shown in FIG. 6) of the primary bore 222.

Figure 5:
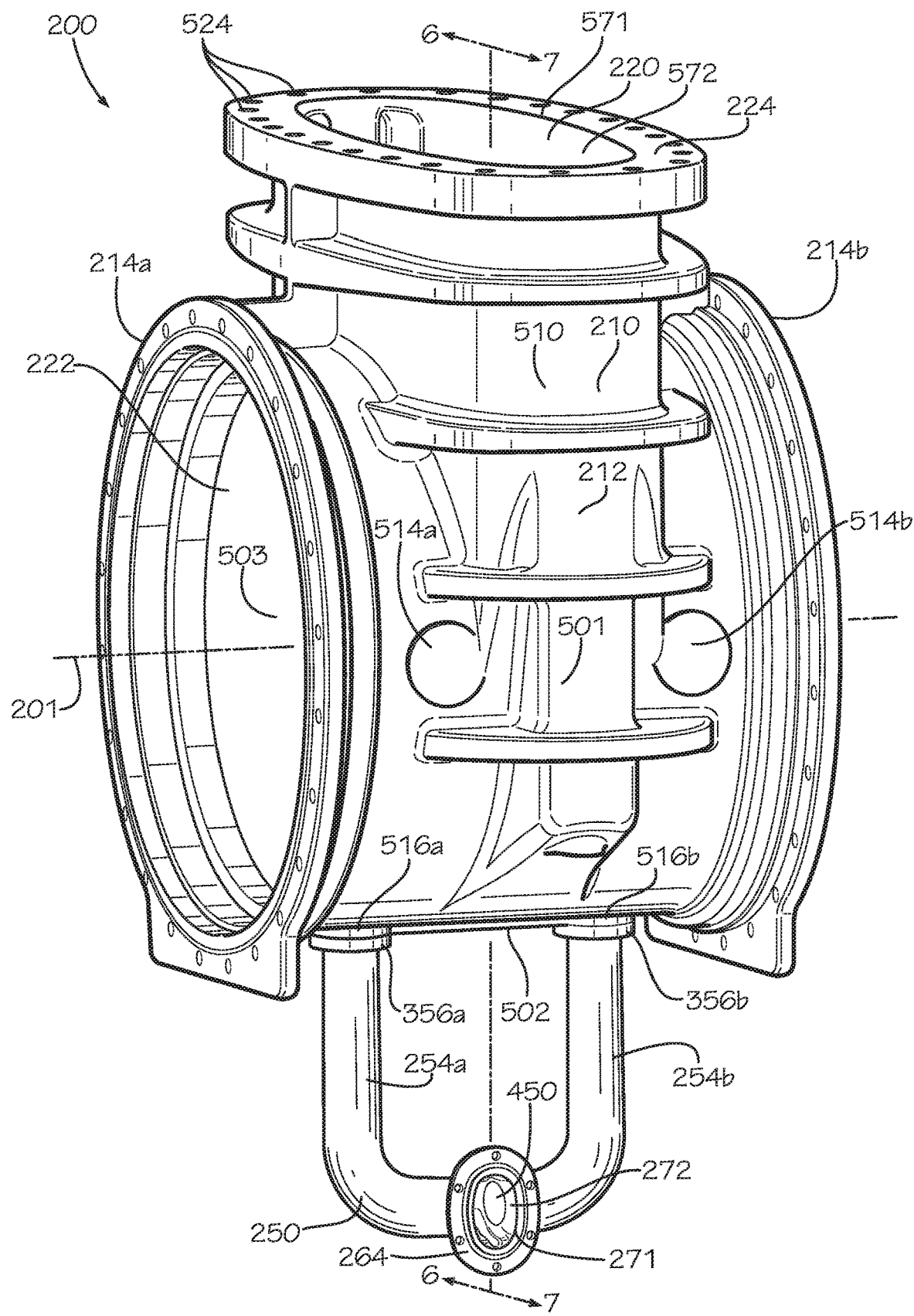
FIG. 5 is a perspective view of the monolithic bypass of FIG. 2 attached in a bottom-mount configuration to another aspect of the primary valve body.

FIG. 5 shows a perspective view of the monolithic bypass 250 of FIG. 2 attached in a bottom-mount configuration to another aspect of the primary valve body 210. In the present aspect, the primary valve body 210 can be a modular valve body 510 comprising multiple pairs of bosses. The modular valve body 510 can comprise a first upstream boss 514a and a first downstream boss 514b disposed on a first side 501 of the middle portion 212 of the modular valve body 510. The modular valve body 510 can comprise a second upstream boss 516a and a second downstream boss 516b disposed at a bottom 502 of the modular valve body 510, opposite from the primary bonnet mounting portion 224. The modular valve body can further comprise a third upstream boss (not shown) and a third downstream boss (not shown) disposed on a second side 503 of the modular valve body 510, opposite from the first side 501. The third bosses can be substantially the same as the first bosses 514a,b. The first, second, and third pairs of bosses can be circumferentially offset about the modular valve body 510 with respect to the primary bore axis 201. In the present aspect, the second bosses 516a,b, can be offset at a 90-degree angle from each of the first bosses 514a,b and the third bosses (not shown). In other aspects, the modular valve body 510 can comprise greater or fewer pairs of bosses which can be arranged in any configuration.

The multiple pairs of bosses allow the monolithic bypass 250 to be installed on the first side 501, the bottom 502, or the second side 503 of the modular valve body 510. In the present aspect, the first bosses 514a,b and the third bosses (not shown) can be unfinished bosses which do not define fastener holes or boss bores. The second bosses 516a,b can be finished bosses which can be substantially the same as the bosses 314a,b of FIG. 3, with the exception that the second bosses 516a,b do not define the O-ring grooves 306a,b in the current aspect. During the manufacturing process, all of the bosses of the modular valve body 510 can initially be unfinished bosses, and the first, second, or third pair of bosses can be machined, drilled, tapped, or otherwise modified to convert a pair of bosses to finished bosses in order to configure the valve body assembly 200 according to a customer's or end user's specifications.

In some aspects, unused bosses can be partially-finished to facilitate reconfiguration of the modular valve body 510 with minimal tooling. For example and without limitations, unused bosses can define completed fastener holes, identical to fastener holes 318, and a partially completed blind boss bore which can be similar to the boss bores 312a,b with the exception that the blind boss bore does not penetrate through to the primary inner surface 220 of the primary bore 222. Partially-finished bosses can be converted to finished bosses by simply finish drilling the blind boss bore through to intersect the primary bore 222. The finish drilling operation can be completed with simple equipment such as a drill press or a hand drill, and the blind boss bore can act as a pilot hole for finish drilling.

In some other applications, such as when an end user desires the ability to stock reconfigurable spare valve body assemblies, multiple pairs or all of the pairs of bosses can be finished bosses, and any unused bosses without an attached monolithic bypass 250 or other mounted equipment can be sealed, such as with a blind flange or plug. In applications in which the unused boss bores are to be sealed with plugs, the boss bores can be threaded, and the plugs can be threadedly engaged with the boss bores. Unused bosses can also be used to install equipment such as injection equipment, corrosion coupons, sampling equipment, or measuring equipment for pressure, temperature, pH, or any other variable.

The terms "upstream," "downstream," "inlet," and "outlet" are merely exemplary and should not be viewed as limiting. In the present application, the primary valve body 210, the modular valve body 510, and the monolithic bypass 250 can each be bi-directional and capable of fluid flow in either direction. Similarly, the monolithic bypass 250 can be reversed in orientation with respect to the primary valve body 210 or modular valve body 510. For example and without limitation, the upstream conduit flange 356a can be attached to the second downstream boss 516b, and the downstream conduit flange 356b can be attached to the second upstream boss 516a, such as to reverse the orientation of the bypass bonnet mounting portion 264 with respect to the modular valve body 510.

FIG. 5 also shows that the bypass valve cavity 272 can extend inwards from the bypass bonnet mounting portion 264 to intersect the bypass bore 450 defined by the monolithic bypass 250. Similarly, the primary inner surface 220 can define a primary valve cavity 572 extending inwards from the primary bonnet mounting portion 224. An intersection between the primary bonnet mounting portion 224 and the primary valve cavity 572 can define a primary cavity opening 571. The primary valve cavity 572 can extend inwards to intersect the primary bore 222, as further shown in FIGS. 6 and 7. The primary bonnet mounting portion 224 can define a plurality of fastener holes 524. The plurality of fastener holes 526 can be configured to attach a primary bonnet 902 (shown in FIG. 9) to the primary bonnet mounting portion 224.

FIG. 6 shows a cross section of the valve body assembly of 200 taken along the line 6-6 shown in FIG. 5. The primary inner surface 220 can define a primary seat portion 610 disposed in an intersection of the primary valve cavity 572 and the primary bore 222, and the primary seat portion 610 can partition the primary bore 222 into the upstream bore portion 322 and the downstream bore portion 622. The upstream bore portion 322 can extend between the upstream end 214a and the primary seat portion 610, and the downstream bore portion 622 can extend between the downstream end 214b and the primary seat portion 610. The primary seat portion 610 can be configured to seal against a primary valve member (not shown), such as a primary gate in aspects wherein the valve body assembly 200 is configured as a gate valve, which can be configured to block flow between the upstream bore portion 322 and the downstream bore portion 622 of the primary bore 222. In the present aspect, the primary seat portion 610 can define an integral seat; however, in other aspects, separate seat components configured to seal against the primary valve member, such as seat rings (not shown), can be installed in the primary seat portion 610. The primary inner surface 220 can further define a pair of primary guide grooves 602,702 (primary guide groove 702 shown in FIG. 7) configured to vertically guide the primary valve member about and between a primary open position in which the primary bore 222 is unobstructed and a primary closed position in which the primary bore 222 is completely sealed.

In the present aspect, the primary valve body 210 and the bypass valve body 252 can both be configured as gate valve bodies. The bypass inner surface 270 can define a bypass seat portion 660 disposed in an intersection of the bypass valve cavity 272 and the bypass bore 450. A bypass body bore 650 of the bypass bore 450 can extend from the upstream body end 462a to the downstream body end 462b, and the bypass seat portion 660 can be defined within the bypass body bore 650. The bypass seat portion 660 can be configured to seal against a bypass valve member (not shown), such as a bypass gate in aspects wherein the valve body assembly 200 comprises a bypass valve configured as a gate valve, which can block flow between the upstream bore 452a and the downstream bore 452b of the bypass bore 450. In the present aspect, the bypass seat portion 660 can define an integral seat; however, in other aspects, separate seat components configured to seal against the bypass valve member, such as seat rings (not shown), can be installed in the bypass seat portion 660. The bypass inner surface 270 can further define a pair of bypass guide grooves 652 configured to guide the bypass valve member about and between a bypass open position in which the bypass bore 450 is unobstructed and a bypass closed position in which the bypass bore 450 is completely sealed. In other aspects, either or both of the primary valve body 210 and the bypass valve body 252 can be configured as a different type of valve such as a ball valve, globe valve, butterfly valve, or any other suitable type of valve.

As shown, the monolithic bypass 250 is completely seamless such that there are no welds, weld seams, mechanical connections, joints, or any other type of connections between any portions of the monolithic bypass 250. The bypass outer surface 268 and the bypass inner surface 270 each extend unbroken between the inlet opening 414a, the outlet opening 414b, and the bypass cavity opening 271

(shown in FIG. 5). The bypass bore 450 can define a continuous flow of homogeneous material from the inlet opening 414a to the outlet opening 414b. The upstream body end 462a of the bypass valve body 252 is seamlessly integrated with the second end 362a of the upstream conduit 254a, and the downstream body end 462b is seamlessly integrated with the second end 362b of the downstream conduit 254b. The bypass body bore 650, the upstream bore 452a, and the downstream bore 452b can comprise the bypass bore 450 which can be seamless. The primary valve body 210 can also be completely seamless.

Figure 7:
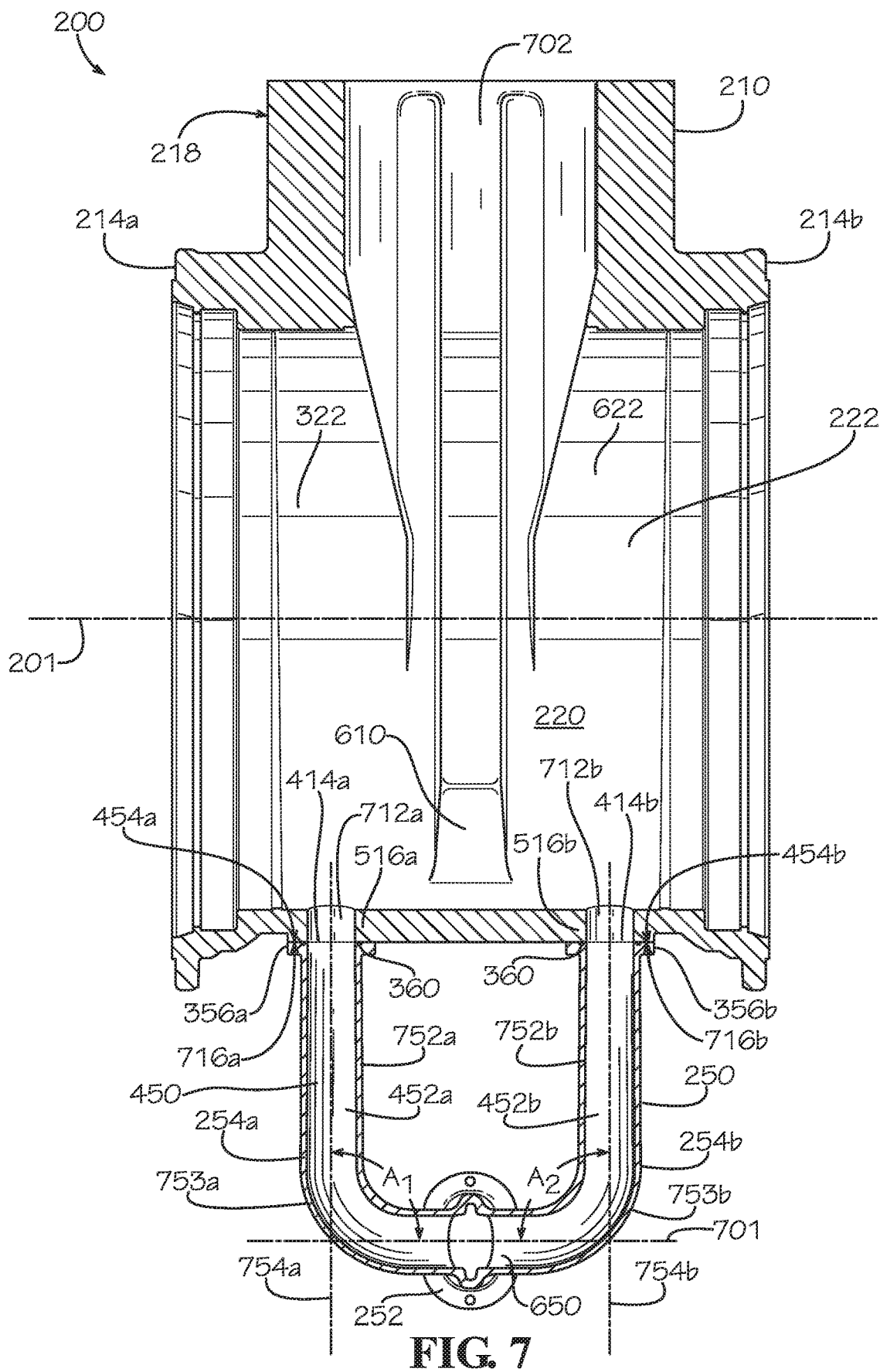
FIG. 7 is a cross-sectional view of the valve body assembly of FIG. 5 taken along line 7-7 shown in FIG. 5.

FIG. 7 shows a cross-section of the valve body assembly 200 taken from the line 7-7 shown in FIG. 5. As shown, the second upstream boss 516a can define an upstream boss bore 712a, and the second downstream boss 516b can define a downstream boss bore 712b. The boss bores 712a,b can be similar to the boss bores 312a,b of the bosses 314a,b of FIG. 3. Each of the boss bores 712a,b can extend through the primary valve body 210 from the primary outer surface 218 to the primary inner surface 220. The upstream boss bore 712a can intersect the upstream bore portion 322 of the primary bore 222, and the downstream boss bore 712b can intersect the downstream bore portion 622. The second upstream boss 516a can define an upstream boss face surface 716a which can be similar to the upstream boss face surface 316a of FIG. 3; and the second downstream boss 516b can define a downstream boss surface 716b which can be similar to the downstream boss face surface 316b of FIG. 3. In the present aspect, the boss bores 712a,b can be defined normal to the respective boss face surfaces 716a,b; however, in other aspects, the boss bores 712a,b can be defined at a non-perpendicular angle to the respective boss face surfaces 716a,b.

The upstream boss face surface 716a can be positioned in facing contact with the upstream flange face surface 454a, and the downstream boss surface 716b can be positioned in facing contact with the downstream flange face surface 454b. O-rings 360 can be disposed between each of the second bosses 516a,b and the conduit flanges 356a,b, respectively, to effect a seal. The seals can seal the boss bores 712a,b in fluid communication with the respective bores 452a,b.

In the present aspect, the upstream conduit 254a can define a linear portion 752a and a transition portion 753a, and the downstream conduit 254b can define a linear portion 752b and a transition portion 753b. The linear portions 752a,b can be defined between the respective conduit flanges 356a,b and the respective transition portions 753a,b. The transition portions 753a,b can each be defined between the respective linear portion 752a,b and the bypass body bore 650 defined by the bypass valve body 252. In the present aspect, the transition portions 753a,b can be curved portions of the respective conduits 254a,b; however, in other aspects, the transition portions 753a,b can be angled between the linear portions 752a,b and the bypass body bore 650. In other aspects, the conduits 254a,b may not define the transition portions 753a,b, and the bores 452a,b can intersect the bypass body bore 650 at an angle as demonstrated by the valve body assembly 200 aspect of FIG. 8.

A portion of the upstream bore 452a defined by the linear portion 752a can define an upstream bore axis 754a, and a portion of the downstream bore 452b defined by the linear portion 752b can define a downstream bore axis 754b. In the present aspect, the upstream bore 452a and the upstream boss bore 712a can be coaxial with respect to the upstream bore axis 754a, and the downstream bore 452b and the downstream boss bore 712b can be coaxial with respect to the downstream bore axis 754b. In other aspects, the upstream bore 452a can be angled with respect to the upstream boss bore 712a, and the downstream bore 452b can be angled with respect to the downstream boss bore 712b.

The bypass body bore 650 can define a bypass body bore axis 701. An intersection between the upstream bore axis 754a and the bypass body bore axis 701 can define an upstream angle $A_1$, and an intersection between the downstream bore axis 754b and the bypass body bore axis 701 can define a downstream angle $A_2$. In the present aspect, each of the bore axes 754a,b can be substantially perpendicular to the bypass body bore axis 701, and the angles $A_1, A_2$ can equal approximately 90 degrees. The bypass body bore axis 701 can be substantially parallel to the primary bore axis 201. The bypass body bore axis 701 can be substantially parallel to the upstream flange face surface 454a and the downstream flange face surface 454b. The upstream bore 452a of the linear portion 752a and the downstream bore 452b of the linear portion 752b can extend radially outward from the bypass body bore axis 701. In other aspects, the angles $A_1, A_2$ can define an angle between 90 and 135 degrees which can improve fluid flow characteristics through the monolithic bypass 250. In such aspects, the liner portions 752a,b can also extend axially with respect to the bypass body bore axis 701.

In the present aspect, the inlet opening 414a and the outlet opening 414b can be disposed radially outward from the bypass body bore 650 relative to the bypass body bore axis 701. In the present aspect, the bypass body bore axis 701 may not extend through the inlet opening 414a or the outlet opening 414b. In other aspects, the bypass body bore axis 701 can extend through a one of either the inlet opening 414a or the outlet opening 414b. In the present aspect, the upstream bore axis 754a and the downstream bore axis 754b can be substantially parallel but are not coaxial. The upstream bore axis 754a can be offset from the downstream bore axis 754b such that the upstream bore axis 754a does not extend through the outlet opening 414b, and the downstream bore axis 754b does not extend through the inlet opening 414a.

Figure 8:
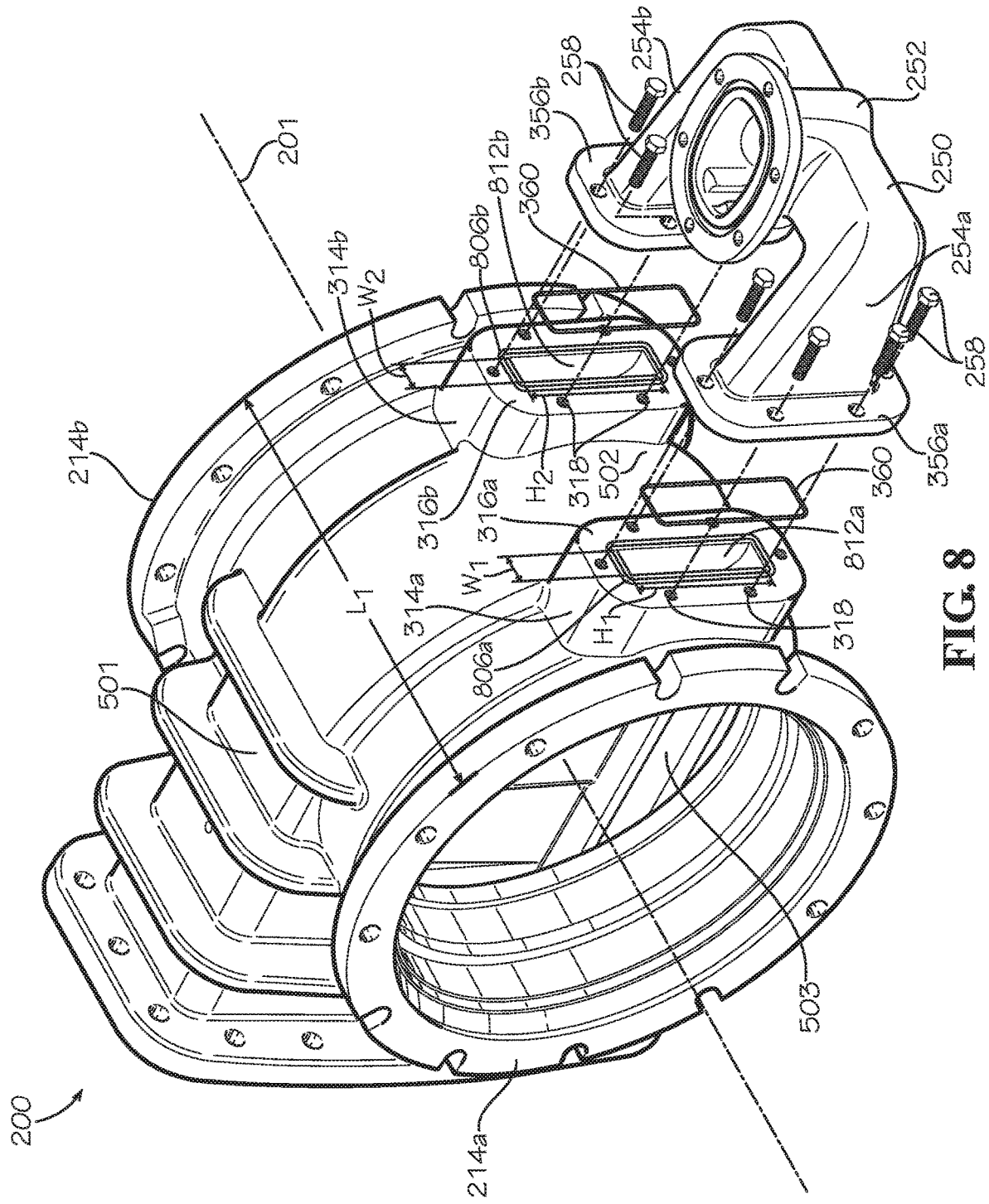
FIG. 8 is exploded view of another aspect of the valve body assembly in accordance with another aspect of the present disclosure.

FIG. 8 shows an exploded view of another aspect of the valve body assembly 200 in a bottom-mount configuration. In the present aspect, the upstream boss 314a and the downstream boss 314b can respectively define a rectangular upstream boss bore 812a and a rectangular downstream boss bore 812b. The rectangular upstream boss bore 812a can define a width $W_1$ measured parallel to the primary bore axis 201 and a height $H_1$ measured perpendicular to the width $W_1$. The rectangular downstream boss bore 812b can define a width $W_2$ measured parallel to the primary bore axis 201 and a height $H_2$ measured perpendicular to the width $W_2$. In the present aspect, the height $H_1$ can be equal to the height $H_2$, and the width $W_1$ can be equal to the width $W_2$. In the current aspect, the bosses 314a,b are positioned at a bottom 502 of the primary valve body 210. In other aspects, the bosses 314a,b can be positioned on the first side 501 or the second side 503 of the primary valve body 210. In other aspects, the primary valve body 210 can also be configured as a modular valve body 510 comprising multiple pairs of bosses 314 with rectangular boss bores 812 distributed circumferentially around the primary valve body 210 with respect to the primary bore axis 201.

With circular-shaped boss bores, such as the boss bores 312a,b of FIG. 3, if it is desired to increase a maximum flow rate through the monolithic bypass 250 for a particular application requiring higher flow rates, a diameter D (not shown) of the boss bores is typically increased to accommodate higher flow rates. Beyond a certain point, increasing the diameter D requires increasing a length $L_1$, measured along the primary bore axis 201 between the upstream end 214a and the downstream end 214b of the primary valve body 210, in order to accommodate the larger diameter D of the boss bores 312a,b. With widths $W_1,W_2$ of equal size to the diameter D, the rectangular boss bores 812a,b can provide an increased maximum flow rate compared to the circular-shaped boss bore by increasing the heights $H_1,H_2$ to provide an increased cross-sectional area over the circular shaped boss bore. Increasing the heights $H_1,H_2$ does not require the length $L_1$ of the primary valve body 210 to be increased. In other aspects, the boss bores can define an oval shape, a square shape, an elliptical shape, or any other shape configured to increase the maximum flow rate through the monolithic bypass 250 without increasing the length $L_1$ of the primary valve body 210.

In the present aspect, the bosses 314a,b, the boss face surfaces 316a,b, the O-rings 360 and the conduit flanges 356a,b can each be shaped complimentary to the rectangular boss bores 812a,b. The upstream conduit 254a and the downstream conduit 254b can each taper extending away from the respective conduit flanges 356a,b in order to provide a transition from the rectangular shape of the rectangular boss bores 812a,b to the substantially circular shape of the bypass body bore 650 (shown in FIG. 6) of the bypass valve body 252. In other aspects, the bypass valve body 252 can define a rectangular-shaped bypass body bore (not shown).

The bosses 314a,b can each define a substantially rectangular O-ring groove 806a,b. In some aspects, the conduit flanges 356a,b can also define substantially rectangular O-ring grooves (not shown). The O-ring grooves 806a,b can be defined extending into the respective bosses 314a,b below the respective boss face surfaces 316a,b. The O-ring grooves 806a,b can be sized and shaped complimentary to the substantially rectangular O-rings 360, and the O-ring grooves 806a,b can each be configured to receive a one of the O-rings 360. In other aspects, the bosses 314a,b may not define the O-ring grooves 806a,b.

Figure 9:
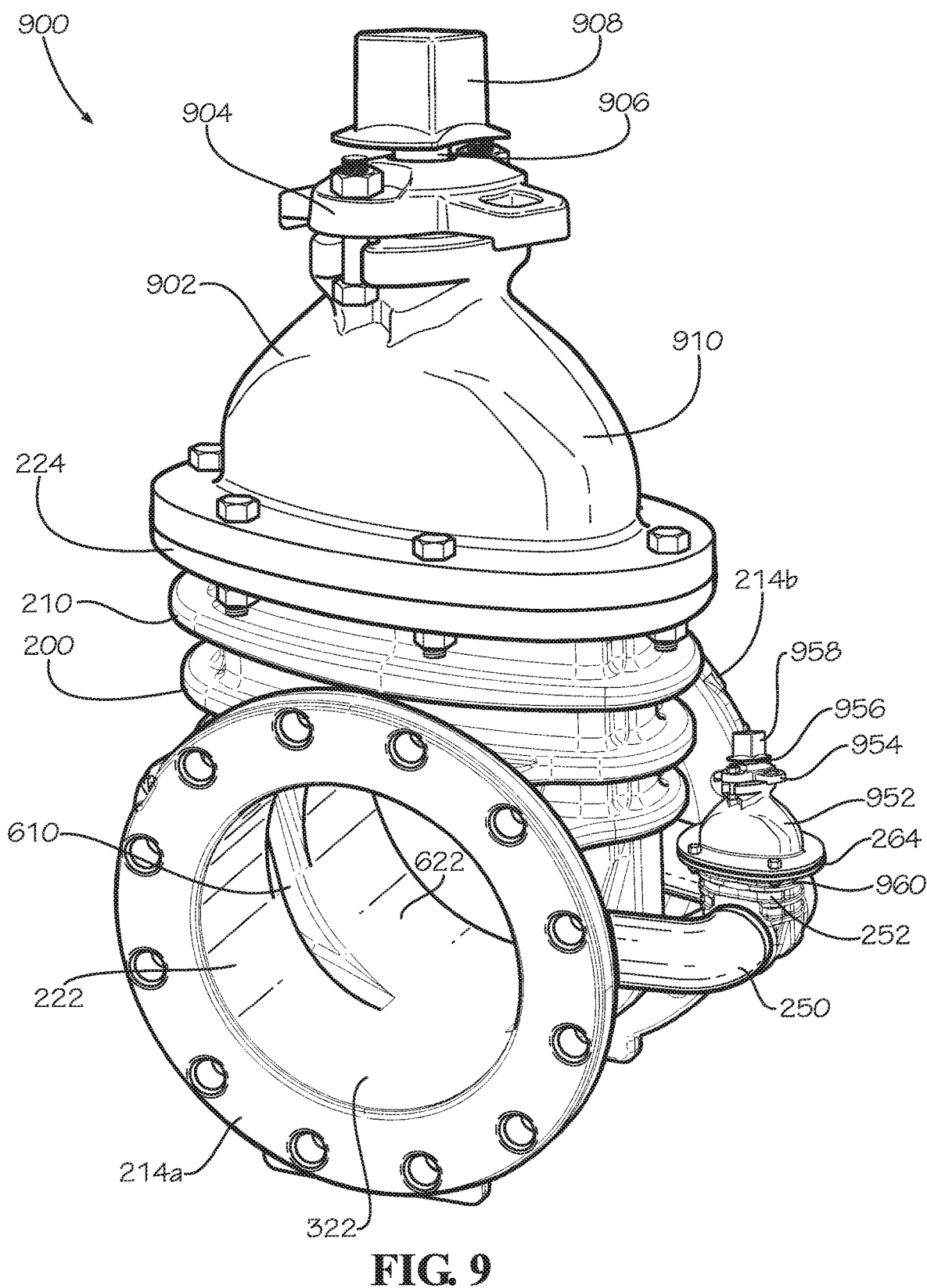
FIG. 9 is a perspective view of a valve assembly assembled on the valve body assembly of FIG. 2.

FIG. 9 shows a perspective view of a valve assembly 900 comprising a primary valve 910 and a bypass valve 960. The valve assembly 900 can be assembled on the valve body assembly 200 of FIG. 2. The primary valve 910 can be assembled on the primary valve body 210 of the valve body assembly 200, and the bypass valve 960 can be assembled on the bypass valve body 252 of the monolithic bypass 250.

The primary valve 910 can comprise the primary bonnet 902, a primary stuffing box 904, a primary stem 906, a primary operating nut 908, and the primary valve member (not shown) built upon the primary valve body 210. In the aspect shown, the primary valve member is a primary gate and the primary valve 910 is thereby configured as a gate valve. The primary bonnet 902 can be fastened to the primary bonnet mounting portion 224 of the primary valve body 210. The primary stuffing box 904 can be fastened atop the primary bonnet 902 with the primary stem 906 extending through an orifice in the primary stuffing box 904. The primary operating nut 908 can be connected to and rotationally fixed to the primary stem 906. The primary bonnet 902 and the primary stuffing box 904 can be configured to seal the primary valve cavity 572 (shown in FIG. 5) and to seal against the primary stem 906.

The bypass valve 960 can comprise the bypass bonnet 952, a bypass stuffing box 954, a bypass stem 956, a bypass operating nut 958, and the bypass valve member (not shown) built upon the bypass valve body 252 of the monolithic bypass 250. In the aspect shown, the bypass valve member is a bypass gate and the bypass valve 960 is thereby configured as a gate valve. The bypass bonnet 952 can be fastened to the bypass bonnet mounting portion 264 of the bypass valve body 252. The bypass stuffing box 954 can be fastened atop the bypass bonnet 952 with the bypass stem 956 extending through an orifice in the bypass stuffing box 954. The bypass operating nut 958 can be connected to and rotationally fixed to the bypass stem 956. The bypass bonnet 952 and the bypass stuffing box 954 can be configured to seal the bypass valve cavity 262 (shown in FIG. 2) and to seal against the bypass stem 956.

In the aspect shown in FIG. 9, the primary valve 910 and the bypass valve 960 can each be configured as gate valves, and the primary valve member and the bypass valve member can be a primary gate and a bypass gate, respectively. By turning the respective stems 906, 956, the primary valve 910 and the bypass valve 960 can each be selectively operated about and between an open position and a closed position. With the primary valve 910 in the closed position, the primary gate seals against the primary seat portion 610, blocking the primary bore 222 and isolating the upstream bore portion 322 from the downstream bore portion 622. With the primary valve 910 in the open position, the primary gate is positioned within the primary valve cavity 572 and the primary bonnet 902 which renders the primary bore 222 open and unobstructed. In the open position, the upstream bore portion 322 and the downstream bore portion 622 are in direct fluid communication with one another.

With the bypass valve 960 in the closed position, the bypass gate seals against the bypass seat portion 660 (shown in FIG. 6), blocking the bypass bore 450 and isolating the upstream bore 452a from the downstream bore 452b. With the bypass valve 960 in the open position, the bypass gate is positioned within the bypass valve cavity 272 and the bypass bonnet 952 which renders the bypass bore 450 open and unobstructed. In the open position, the upstream bore 452a and the downstream bore 452b are in direct fluid communication with one another.

In operation, the primary valve 910 and the bypass valve 960 can both be in the closed position to prevent the travel of a fluid from the upstream bore portion 322 to the downstream bore portion 622 of the primary bore 222. If the bypass valve 960 is in the open position while the primary valve 910 is in the closed position, the upstream bore portion 322 and the downstream bore portion 622 are in indirect fluid communication through the bypass bore 450, and the fluid can travel from the upstream end 214a to the downstream end 214b.

In typical operation, the bypass valve 960 remains in the closed position. If the primary valve 910 is selectively operated and placed in the closed position, no fluids can pass from the upstream end 214a to the downstream end 214b. If a significant pressure differential develops between the upstream bore portion 322 and the downstream bore portion 622, an unbalanced force can be exerted on the primary gate which can prevent the primary valve 910 from being operated to the open position due to a force of friction, caused by the unbalanced force, acting on the primary gate.

In this situation, the bypass valve 960 can be selectively operated to the open position which allows the fluid to bypass the primary gate. The bypass valve 960 and the bypass gate are also affected by the unbalanced force; however, the bypass bore 450 is smaller in diameter than the primary bore 222 which reduces the effect of the unbalanced force due to the bypass bore 450 defining a smaller cross-sectional area. After a period of time, the pressure differential can be reduced or eliminated which reduces or eliminates the unbalanced force and the friction force acting on the primary gate, thereby allowing the primary valve 910 to be selectively operated to the open position. After operating the primary valve 910 to the open position, the bypass valve 960 is typically operated to the closed position.

Each of the primary valve body 210 and the monolithic bypass 250 can be a monolithic casting. Each monolithic casting can be formed from a single material in a single casting operation. The upstream conduit 254a and the downstream conduit 254b can be seamlessly integrated with the bypass valve body 252 to form the monolithic bypass 250 without any welds or mechanical connections such as threading, flanges, fasteners, interference fits, adhesives, brazing, soldering, or other mechanical methods of connection. The primary valve body 210 and the monolithic bypass 250 can each be cast from a single mold. The mold can be formed through an additive manufacturing process, such as a 3D sand printing process. Additive manufacturing processes are further described in U.S. patent application Ser. No. 15/346,047, filed Nov. 8, 2016, which is hereby incorporated by reference herein.

Additive manufacturing refers to a process in which a 3D object can be formed by depositing or bonding successive layers of material to the previous layers of material. Additive manufacturing can comprise different types of processes such as a deposition, light polymerization, powder bed, or lamination process. For example, in a deposition process, material can be selectively deposited according to a cross-section of the 3D object corresponding to that layer. The material can be deposited through methods such as extruding a material in a molten state which can fuse to the previous layer or depositing material in the form of a wire or granule while applying an energy source such as an electrical current or laser to fuse the material to the previous layer. The material is only applied to areas corresponding to the cross-section of the layer. Deposition processes comprise, but are not limited to, fused deposition modeling, robocasting, directed energy deposition, electron beam freeform fabrication, 3D printer extrusion, and material jet printing.

By contrast, in a powder bed process, a layer of loose granular material can be evenly applied in a bed or a job box, and areas of the layer corresponding to the cross-section of the 3D object for that layer can be selectively treated to fuse or bind the material together. In some powder bed processes, a glue or binder can be selectively sprayed on the layer of granular material which binds the loose granular material together to form the cross-section. In some powder bed processes, an energy source such as a laser, electron beam, or electrical current can selectively be applied to melt and sinter the granular material corresponding to the cross-section of the 3D object. Successive layers are sintered or bound to previous layers, and the remaining loose granular material can be removed leaving the 3D object behind upon completion. Powder bed processes comprise, but are not limited to, binder jetting, 3D sand printing, direct metal laser sintering, electron beam melting, selective heat sintering, and selective laser melting.

Light polymerization processes can be similar to powder bed processes with the difference being that the material is often deposited as a liquid, such as a polymer resin in a bath or a vat instead of a job box. The material can be selectively treated with an energy source such as a light source, heat source, or laser corresponding to the cross-section for the layer. The energy source can cause the material to solidify, thereby forming the cross-section of the 3D object for the layer. Light polymerization processes can comprise, but are not limited to, stereolithography and digital light processing.

Lamination processes supply material in the form of a foil or a film, often fed from a roll, which can be treated with an adhesive or bonded by other means. The material is fed over a platform upon which the 3D object is built. A mechanical means, such as a blade, or an energy source, such as a laser, cuts out the first layer corresponding to the first cross-section of the 3D model from the material and deposits the material on the platform. The platform can then lower and a new portion of the foil or film is fed over the platform, and a successive layer is cut out corresponding to a second cross-section of the 3D object. The successive layer can then be bonded to the previous layer by the adhesive. Lamination processes can comprise, but are not limited to, laminated object manufacturing and ultrasonic consolidation.

When forming the mold in the 3D sand printing process, a first arm of a 3D sand printing machine can deposit a thin, substantially planar layer of sand in the job box. The layer of sand can have a layer thickness. A second arm can traverse over the layer of sand and selectively spray a binder on the layer of sand corresponding to the cross-section of the 3D object for a first layer. Areas of the sand sprayed by the binder can cement together while areas not sprayed by the binder remain loose and granular. The layer can be selectively sprayed with the binder on the layer of sand corresponding to the cross-section of the mold for the first layer at a first mold height. The cross-sections of the mold can be formed complimentary to the monolithic bypass 250 such that solid portions of the monolithic bypass 250, such as the conduit flanges 356a,b, can correspond to voids in the mold, and openings or cavities in the monolithic bypass 250, such as the bypass valve cavity 272, can correspond to solid portions of the mold. Similarly, cross-sections of another mold can be formed complimentary to the primary valve body 210 in order to produce a mold cavity shaped complimentary to the primary valve body 210.

The job box can then lower by an incremental distance equal to the layer thickness, and the first arm can then deposit a successive planar layer of sand. The second arm can then traverse over the successive layer of sand, and can selectively spray the binder on the successive layer of sand corresponding to a cross-section of the mold of a second layer at a second mold height which can cement the sprayed areas and can bond the sprayed areas of the second layer to the sprayed areas of the first layer. The process can repeat alternatively depositing the substantially planar layers of sand and then selectively spraying the binder on the layer of sand until the mold has reached its full height. The mold can be built up from the bottom layer by layer until the mold is fully formed.

At this time, the mold has been formed by the sand which has been treated by the binder while untreated sand remains loose and granular and can be shaken, vacuumed, blown, or brushed away from the mold. In some aspects, the mold can comprise multiple subcomponents which can be glued or mechanically connected to assemble the mold. The mold can define vents to allow air to escape when molten material is poured into the mold. The mold can define a monolithic bypass mold cavity formed complimentary to a shape of the monolithic bypass 250. In some aspects, the mold can comprise cores formed complimentary to any one of bypass bore 450 or the bypass valve cavity 272.

Upon assembling the mold, a molten material, such as molten metal, can be poured into the mold. After the molten material has solidified, the monolithic bypass 250 can be removed from the mold. Because the mold is made of sand, it can be destroyed to remove the monolithic bypass 250 from the mold, and portions of the mold within the bypass bore 450 and the bypass valve cavity 272 can be broken up to be removed. The mold can be broken up by mechanical means such as with a hammer, chisel, or drill, by vibrations such as with ultrasonic waves, or by spraying with water such as from a high-pressure source. In some aspects, the binder can be water-soluble. In other aspects, the mold can be re-used. In other aspects, either or both of the monolithic bypass 250 and the primary valve body 210 can be formed by 3D printing the respective monolithic bypass 250 and primary valve body 210 from a suitable rigid material rather than 3D printing the mold.

In other aspects, the monolithic bypass 250 or the primary valve body 210 can be formed by an investment casting process. A master pattern of the monolithic bypass 250 or the primary valve body 210 can be formed, such as by an additive manufacturing process. The master pattern can be substantially identical in shape and size to the monolithic bypass 250 or the primary valve body 210 or a subcomponent of either. The master pattern can be used to cast a master mold or a master die around the master pattern, thereby producing a master mold cavity shaped complimentary to the monolithic bypass 250 or the primary valve body 210 or a subcomponent of either. So-called "wax patterns" can then be cast within the master mold cavity from materials such as plastic, wax, or foam. The wax patterns can also be substantially identical in shape and size to the monolithic bypass 250 or the primary valve body 210 or a subcomponent of either. In some investment casting processes, individual wax pattern subcomponents can be assembled to form an assembled wax pattern which can be substantially identical in shape and size to the monolithic bypass 250 or the primary valve body 210.

A ceramic mold, or an investment, can be formed by applying and curing coats of ceramic refractory material to the wax pattern. Once the investment has cured, the wax pattern can then be melted or vaporized out of the investment, leaving an open investment cavity formed complimentary to either the monolithic bypass 250 or the primary valve body 210. The monolithic bypass 250 or the primary valve body 210 can then be cast in the investment by pouring molten material into the open investment casting. Upon solidification of the molten material, the monolithic bypass 250 or primary valve body 210 can be divested or removed from the investment. Operations such as media blasting, hammering, vibration, or water jetting can be used to divest the monolithic bypass 250 or the primary valve body 210 from the investment. Alternatively, an additive manufacturing process could be used to form the individual wax patterns rather than the master pattern.

Using the monolithic bypass 250 to conduct a bypass operation of the closed primary valve 910 can be a violent and stressful operation for the valve assembly 900, and specifically the monolithic bypass 250. In liquid service, a significant water-hammer effect is exerted on the monolithic bypass 250 at the moment that the bypass valve 960 is first opened. In gas service, the monolithic bypass 250 can also be exposed to extremely low temperatures due to the Joules-Thomson effect which causes the gas to cool as it expands when traveling through the monolithic bypass 250 from a high-pressure side of the closed primary valve 910 to a lower pressure side of the valve. The Joules-Thomson effect can also cause droplets of condensed liquid to drop out of the gas. If the pressure differential is great enough, the gas can approach sonic velocities as well. The speed of the gas traveling through the monolithic bypass 250, especially with the presence of condensed droplets, can be extremely erosive on the monolithic bypass 250. The bypass operation can also cause vibration in the monolithic bypass 250 which can stress and fatigue components.

However, the monolithic casting of the monolithic bypass 250, resulting in the seamless bypass bore 450, is well-suited for such service and is superior to the typical bypass assembly 103 shown in FIG. 1. Compared to the typical bypass assembly 103, the monolithic bypass 250 can minimize the number of flanged connections 112. Flanged connections 112 can be susceptible to the water-hammer effect as it places significant stress on the fasteners which can lead to leaking. Additionally, the internal sealing surface defined by the flanged connections 112 is not uniform and smooth which can exacerbate erosion caused during bypass operations. Each of the flanged connections 112 represents a possible leak path which is eliminated from the design of the monolithic bypass 250.

Because of the precision and smooth surfaces of the molds produced by 3D sand casting, very little finishing work is required for the monolithic bypass 250 or the primary valve body 210. By contrast, the typical bypass assembly 103 can frequently require re-work and intensive finishing work to produce an acceptable finished product which can add to manufacturing costs. Because of the relatively short lengths of the fittings comprising the typical bypass assembly 103, it is difficult to maintain tight fabrication tolerances as well as to adjust for any deviation thereof. For instance, if the nipples 106 are welded to the typical body portion 104, heat distortion and the welding process can affect the overall lengths of the nipples 106 as well as the angles at which nipples 106 extend outwards from the typical body portion 104. However, because of the short length of the nipples 106, the nipples 106 cannot be easily deflected to aid in mating the flanged connections 112. The elbows 110a,b are short, stiff, pre-manufactured pipe fittings which cannot be readily altered in order to account for out-of-tolerance dimensions which can negatively affect the mating and seal quality of the flanged connections 112. The seal quality of each flanged connection 112 is very sensitive to angular and dimensional misalignment, and many design codes include limits on the degree to which force can be used to align the flanges when mating each flanged connection 112.

In other applications in which the nipples 106a,b are threaded into internally threaded holes (not shown) defined by the typical body portion 104, alignment between the nipples 106a,b and the respective elbows 110a,b can be sensitive to a depth to which the internally threaded holes are threaded as well as indexing of the threading of each internally threaded hole. The nipples 106a,b must be fully screwed into the internally threaded holes in order to form a reliable seal; however, if the indexing of the threading is not correct, the elbows 110a,b can be angularly misaligned at the flanged connection 112c. The internally threaded holes can be thread to a greater depth to correct the indexing of the nipples 106a,b; however, if a length of the nipple 106a and the bypass valve 108 is not substantially equal to a length of the nipple 106b, the elbows 110a,b will experience offset misalignment at the flanged connection 112c. Because the variables are interrelated, properly aligning and sealing all of the components of the typical bypass assembly 103 can be difficult and require substantial rework. The monolithic bypass 250 and primary valve body 210 can eliminate issues of misalignment and leaking while significantly increasing a first-time yield rate during assembly.

Additionally, flanged connections 112 under residual stress from misalignment are also more sensitive to effects such as water-hammer, vibration, and thermal contraction. Residual stress can also lead to cracking and embrittlement in corrosive service or sulfide service. The flanged connections 112 typically employ a gasket positioned between each of the flanges which is often made of a different material such as elastomers, polymers, and graphite. These gaskets exhibit different thermal expansion coefficients from the flanges of the flange connections 112 which are typically made of metals or plastics. Consequently, under extreme temperature changes such as those caused by the Joules-Thomson effect, the gasket can shrink away from the flanges causing a failure in the seal.

In aspects in which the nipples 106 are welded to the typical body portion 104, the welded connections often have small inclusions such as porosity, slag, or cracks which can grow when subjected to vibration or extreme thermal stresses. In aspects in which the nipples are screwed into the typical body portion 104, the threads act as stress risers which can nucleate cracks when subjected to vibration and thermal contraction. Additionally, crevice corrosion can occur between the threading of the nipples 106 and the typical body portion 104 which can exacerbate the failure of the threaded connection.

Another advantage of the monolithic bypass 250 is that, because the monolithic bypass 250 is integrally cast, a shape of the monolithic bypass 250 is not limited by the machining capabilities of equipment such as mills and lathes, nor is the shape limited by the availability of off-the-shelf fittings and components, as exemplified by the aspect of FIG. 8. Integral strengthening features such as a reinforcement web (not shown) extending between the upstream conduit 254a, downstream conduit 254b, and bypass valve body 252 can also be added to the monolithic bypass 250. Consequently, the shape of the monolithic bypass 250 can be optimized to provide increased resistance to erosion, reduced water-hammer, and improved flow characteristics such as direct laminar flow and reduced turbulence. These improved flow characteristics can reduce fluid frictional loss. The monolithic bypass 250 can also be positioned closer to the primary valve body 210 to reduce the footprint of the valve body assembly 200 for use in space-critical environments.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A monolithic bypass comprising:
   an upstream conduit, the upstream conduit defining a first end and a second end, the upstream conduit defining an upstream bore extending from the first end to the second end, the first end defining an inlet opening to the upstream bore;
   a downstream conduit, the downstream conduit defining a first end and a second end, the downstream conduit defining a downstream bore extending from the first end to the second end, the first end defining an outlet opening to the downstream bore; and
   a bypass valve body seamlessly connected to the second end of the upstream conduit and the second end of the downstream conduit, the bypass valve body defining a bypass body bore extending from the second end of the upstream conduit to the second end of the downstream conduit, the bypass body bore intersecting the upstream bore and the downstream bore, the bypass body bore defining a bypass body bore axis, the upstream bore, the downstream bore, and the bypass body bore defining a seamless bypass bore extending from the inlet opening to the outlet opening, the bypass valve body defining a bypass seat portion positioned within the bypass body bore between the upstream bore and the downstream bore, the bypass seat portion configured to seal against a bypass valve member to prevent a fluid flow from the upstream bore to the downstream bore; and
   wherein the monolithic bypass is substantially U-shaped.

2. The monolithic bypass of claim 1, further comprising the bypass valve member, the bypass valve member being selectively positionable about and between a bypass open position and a bypass closed position, the bypass bore being unobstructed with the bypass valve member positioned in the bypass open position, the bypass valve member sealing with the bypass seat portion to block the bypass bore with the bypass valve member in the bypass closed position.

3. The monolithic bypass of claim 2, wherein:
   the bypass valve body defines a bypass valve cavity;
   the bypass valve cavity intersects the bypass bore between the upstream bore and the downstream bore; and
   the bypass valve member is positioned within the bypass valve cavity.

4. The monolithic bypass of claim 2, wherein:
   the bypass valve body is a gate valve body; and
   the bypass valve member is a gate.

5. The monolithic bypass of claim 1, wherein:
   an upstream conduit flange is disposed at the first end of the upstream conduit;
   the upstream conduit flange defines the inlet opening;
   a downstream conduit flange is disposed at the first end of the downstream conduit; and
   the downstream conduit flange defines the outlet opening.

6. The monolithic bypass of claim 5, wherein:
the upstream conduit flange defines an upstream flange face surface which is substantially planar;
the downstream conduit flange defines a downstream flange face surface which is substantially planar; and
the upstream conduit flange face surface is substantially parallel to the downstream conduit flange face surface.

7. The monolithic bypass of claim 1, wherein the bypass bore is defined by a continuous flow of material from the inlet opening to outlet opening.

8. The monolithic bypass of claim 1, wherein:
the inlet opening and the outlet opening are each disposed radially outward from the bypass body bore relative to the bypass body bore axis; and
the bypass body bore axis does not extend through either the inlet opening or the outlet opening.

9. The monolithic bypass of claim 1, wherein the first end of the upstream conduit and the first end of the downstream conduit are each configured to attach to a primary valve body.

10. The monolithic bypass of claim 1, wherein the upstream bore and the downstream bore extend radially outward from the bypass body bore relative to the bypass body bore axis.

11. The monolithic bypass of claim 1, wherein the upstream conduit, the downstream conduit, and the bypass valve body, in combination, comprise a monolithic casting formed from a single material.

12. A valve assembly comprising:
a primary valve body, the primary valve body defining an upstream end and a downstream end disposed opposite from the upstream end, the primary valve body defining a primary outer surface and a primary inner surface disposed opposite from the primary inner surface, the primary inner surface defining a primary bore extending from the upstream end to the downstream end, the primary valve body defining an upstream boss bore and a downstream boss bore each extending through the primary valve body from the primary outer surface to the primary inner surface, the upstream boss bore intersecting an upstream portion of the primary bore proximate to the upstream end, the downstream boss bore intersecting a downstream portion of the primary bore proximate to the downstream end; and
a monolithic bypass, the monolithic bypass comprising:
an upstream conduit, the upstream conduit defining a first end and a second end, the upstream conduit defining a seamless upstream bore extending from the first end to the second end, the upstream bore sealed in fluid communication with the upstream boss bore at the first end;
a downstream conduit, the downstream conduit defining a first end and a second end, the downstream conduit defining a seamless downstream bore extending from the first end to the second end, the downstream bore sealed in fluid communication with the downstream boss bore at the first end;
a bypass valve body seamlessly connected to the second end of the upstream conduit and the second end of the downstream conduit, the bypass valve body defining a bypass body bore extending from the second end of the upstream conduit to the second end of the downstream conduit, the bypass body bore seamlessly intersecting the upstream bore and the downstream bore, the bypass body bore defining a bypass seat portion positioned between the upstream bore and the downstream bore; and
a bypass valve member configured to seal against the bypass seat portion to prevent a fluid flow through the bypass body bore between the upstream bore and the downstream bore.

13. The valve assembly of claim 12, wherein:
the primary outer surface defines an upstream boss;
the upstream boss bore extends through the upstream boss; and
the first end of the upstream conduit is attached to the upstream boss.

14. The valve assembly of claim 13, wherein:
an upstream conduit flange is defined at the first end of the upstream conduit;
the upstream conduit flange is attached to the upstream boss by a plurality of fasteners; and
a seal is formed between the upstream boss and the upstream conduit flange.

15. The valve assembly of claim 13, wherein:
the primary bore defines a primary bore axis;
the upstream boss is a first upstream boss;
the primary outer surface defines a second upstream boss; and
the first upstream boss is circumferentially offset from the second upstream boss relative to the primary bore axis.

16. The valve assembly of claim 12, wherein:
the bypass valve body defines a bypass valve cavity;
the bypass valve cavity intersects the bypass bore between the upstream bore and the downstream bore; and
the bypass valve member is positioned within the bypass valve cavity.

17. The valve assembly of claim 16, wherein:
the bypass valve member is selectively positionable about and between a bypass open position and a bypass closed position;
the bypass bore is unobstructed with the bypass valve member in the bypass open position; and
the bypass valve member seals with the bypass seat portion to block the bypass bore with the bypass valve member in the bypass closed position.

18. The valve assembly of claim 12, further comprising a primary valve member, wherein:
the primary bore defines a primary seat portion; and
the primary seat portion is configured to seal against the primary valve member to prevent a fluid flow through the primary bore between the upstream end and the downstream end.

19. The valve assembly of claim 12, wherein the bypass body bore is substantially parallel to the primary bore.

20. The valve assembly of claim 12, wherein:
the primary bore defines a primary bore axis; and
the monolithic bypass extends radially outwards from the primary valve body relative to the primary bore axis.

* * * * *